(12) United States Patent
Souparis et al.

(10) Patent No.: US 9,550,390 B2
(45) Date of Patent: Jan. 24, 2017

(54) OPTICAL SECURITY COMPONENT, FABRICATION OF SUCH A COMPONENT AND SECURE PRODUCT EQUIPPED WITH SUCH A COMPONENT

(71) Applicant: Hologram.Industries, Bussy Saint Georges (FR)

(72) Inventors: Hugues Souparis, Paris (FR); Valéry Petiton, Vendrest (FR); Vincent Tollet, Bouleurs (FR)

(73) Assignee: Hologram.Industries, Bussy Saint Georges (FR)

( * ) Notice: Subject to any disclaimer, the term of this patent is extended or adjusted under 35 U.S.C. 154(b) by 275 days.

(21) Appl. No.: 14/394,220

(22) PCT Filed: Apr. 11, 2013

(86) PCT No.: PCT/EP2013/057632
§ 371 (c)(1),
(2) Date: Oct. 13, 2014

(87) PCT Pub. No.: WO2013/153182
PCT Pub. Date: Oct. 17, 2013

(65) Prior Publication Data
US 2015/0084327 A1    Mar. 26, 2015

(30) Foreign Application Priority Data
Apr. 13, 2012  (FR) ..................................... 12 53444

(51) Int. Cl.
*B42D 25/00*  (2014.01)
*B42D 25/324*  (2014.01)
(Continued)

(52) U.S. Cl.
CPC .............. *B42D 25/36* (2014.10); *B41M 3/148* (2013.01); *B42D 25/00* (2014.10); *B42D 25/324* (2014.10);
(Continued)

(58) Field of Classification Search
CPC .............................. B42D 25/00; B42D 25/324
(Continued)

(56) References Cited

U.S. PATENT DOCUMENTS 7,215,450 B2 *  5/2007  Schilling ................ B42D 25/00
                                                                       283/86
2008/0258456 A1 * 10/2008  Rahm .................... B42D 25/29
                                                                       283/85
(Continued)

FOREIGN PATENT DOCUMENTS

DE     102007020026 A1 * 11/2007 ............. D21H 21/40
EP         0721849 A1    7/1996
(Continued)

OTHER PUBLICATIONS

International Search Report issued in PCT/EP2013/057632 mailed on Aug. 6, 2013 (6 pages).
(Continued)

*Primary Examiner* — Kyle Grabowski
(74) *Attorney, Agent, or Firm* — Osha Liang LLP

(57) ABSTRACT

An optical security component intended to be checked in reflection in a checking spectral band includes a layer that is reflective in the checking spectral band. The layer exhibits a structured zone that includes microstructures distributed spatially in a uniform manner over a whole of the structured zone so as to form an optical structure that is at least partially scattering in the checking spectral band. The microstructures have heights that are distributed according to a random function, modulated over the structured zone by a modula-
(Continued)

tion function so as to form, after illumination of the optical security component at a given angle, an image identifiable by observation in reflection.

9 Claims, 9 Drawing Sheets

(51) Int. Cl.
*G02B 5/02* (2006.01)
*B42D 25/36* (2014.01)
*B42D 25/328* (2014.01)
*B42D 25/45* (2014.01)
*B42D 25/425* (2014.01)
*B42D 25/455* (2014.01)
*B42D 25/47* (2014.01)
*B41M 3/14* (2006.01)
*G06K 9/00* (2006.01)

(52) U.S. Cl.
CPC ........ *B42D 25/328* (2014.10); *B42D 25/425* (2014.10); *B42D 25/45* (2014.10); *B42D 25/455* (2014.10); *B42D 25/47* (2014.10); *G02B 5/02* (2013.01); *G02B 5/0263* (2013.01); *G02B 5/0284* (2013.01); *G06K 9/00577* (2013.01); *B42D 2033/18* (2013.01); *G06K 2009/0059* (2013.01)

(58) Field of Classification Search
USPC ........................................... 359/599
See application file for complete search history.

(56) References Cited

U.S. PATENT DOCUMENTS

| 2009/0179418 A1* | 7/2009 | Stalder ................ G02B 5/0284 |
| | | 359/599 |
| 2010/0071237 A1 | 3/2010 | Toda et al. |
| 2011/0085241 A1 | 4/2011 | Purchase et al. |
| 2012/0064303 A1 | 3/2012 | Yashiki et al. |

FOREIGN PATENT DOCUMENTS

| FR | 2852267 A1 | 9/2004 | |
| FR | 2959830 A1 | 11/2011 | |
| JP | WO 03029014 A1 * | 4/2003 | ............ B42D 25/29 |
| WO | 98/26373 A1 | 6/1998 | |
| WO | 99/17941 A1 | 4/1999 | |
| WO | 01/80175 A1 | 10/2001 | |

OTHER PUBLICATIONS

Written Opinion of the International Searching Authority issued in PCT/EP2013/057632 mailed on Aug. 8, 2013 (5 pages).

* cited by examiner

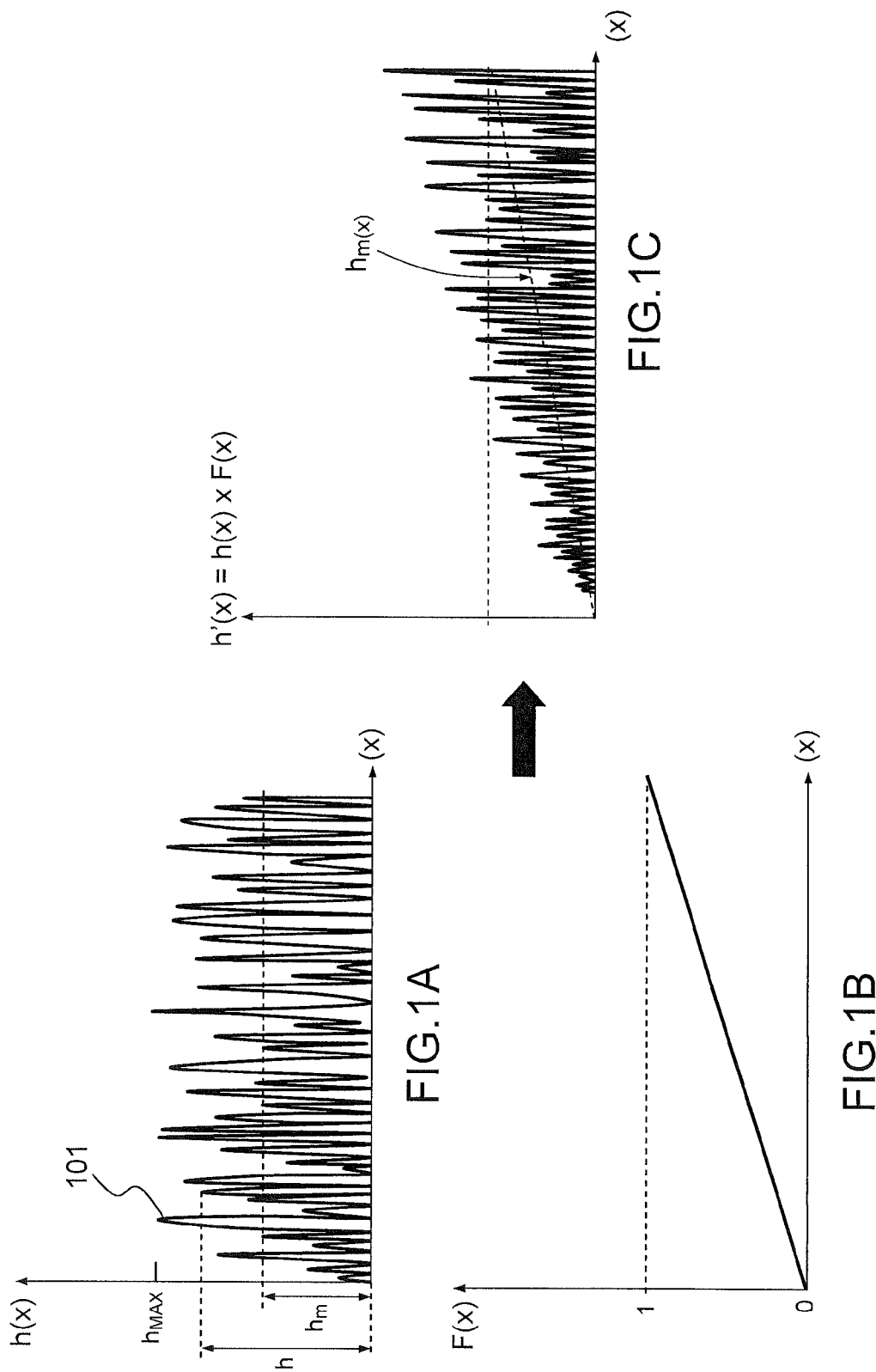

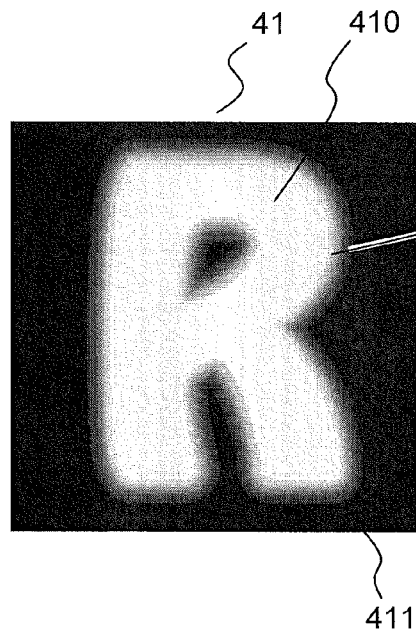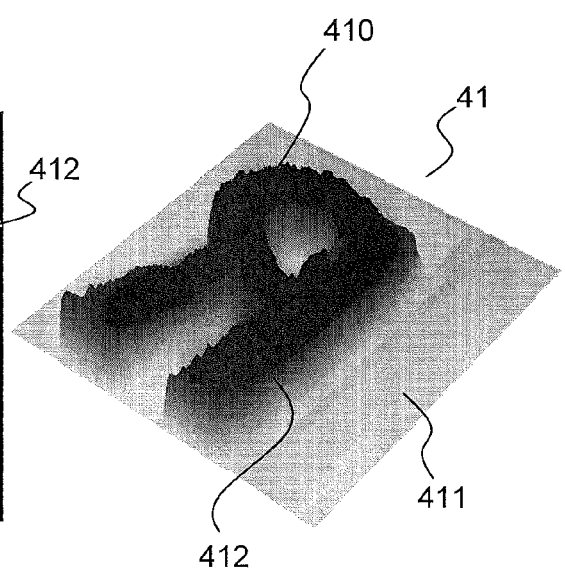
FIG.4A  FIG.4B
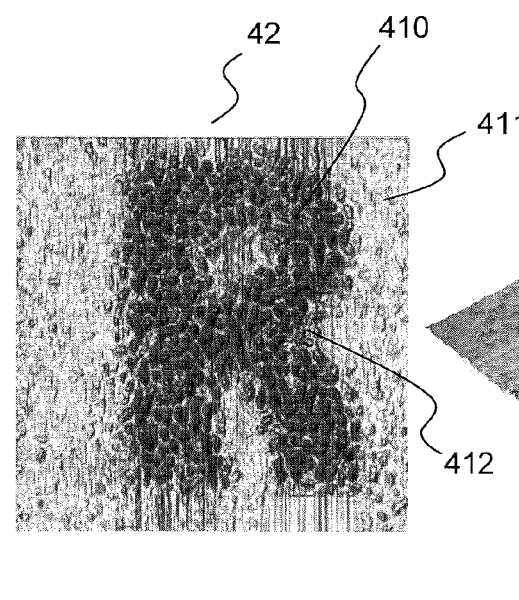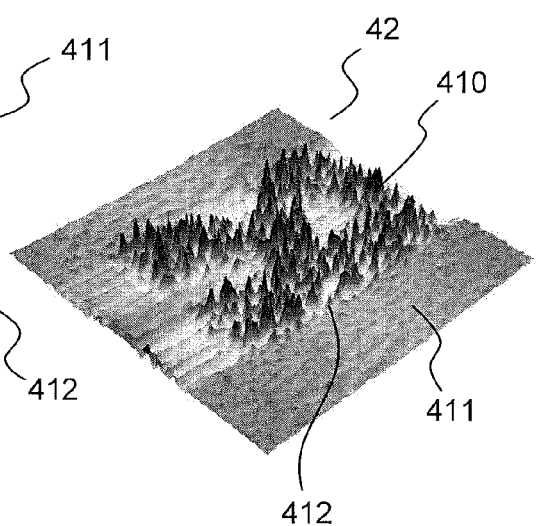
FIG.4C  FIG.4D

51

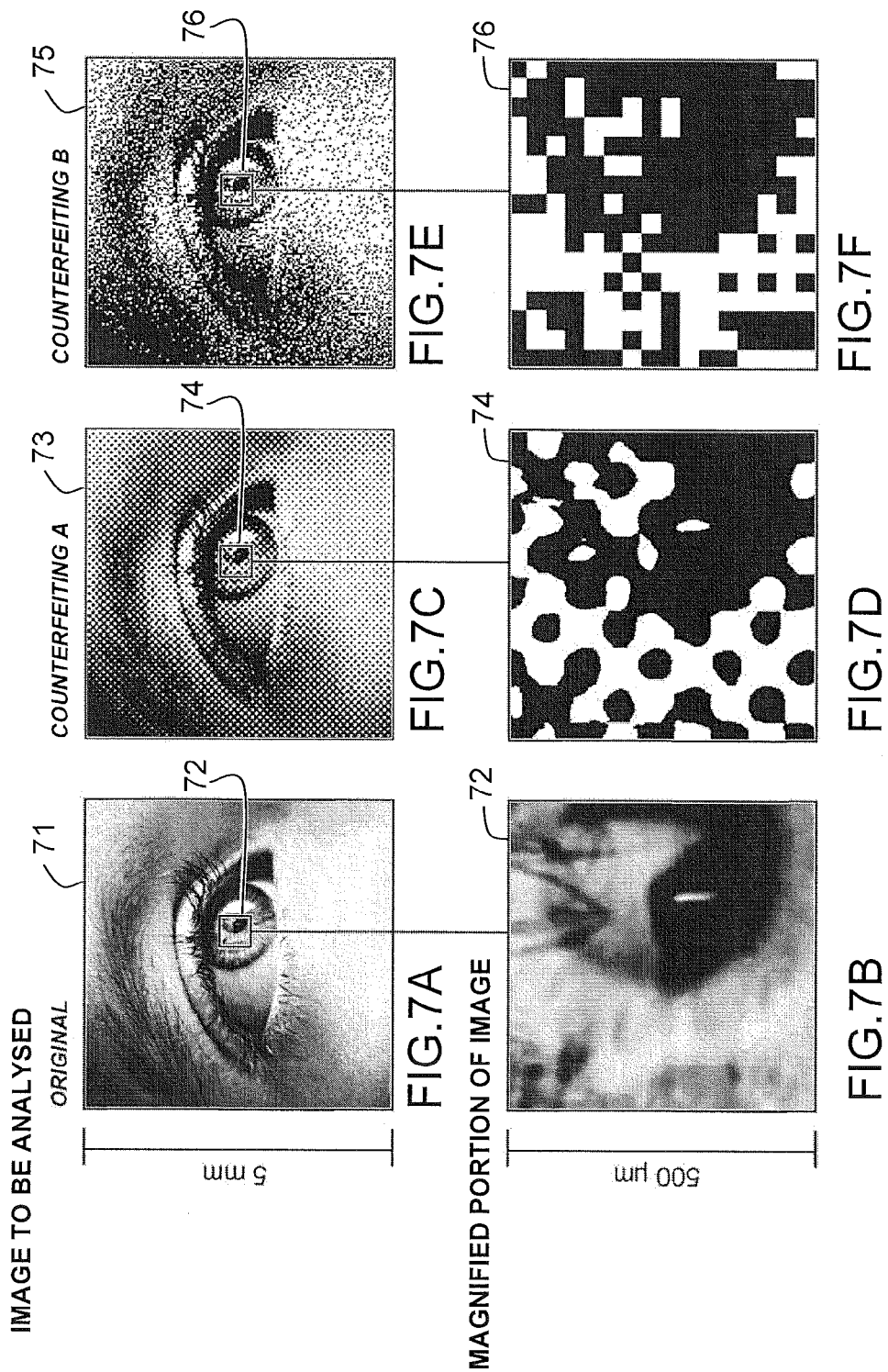

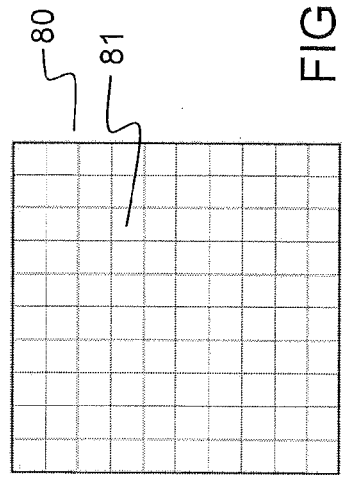
FIG.8
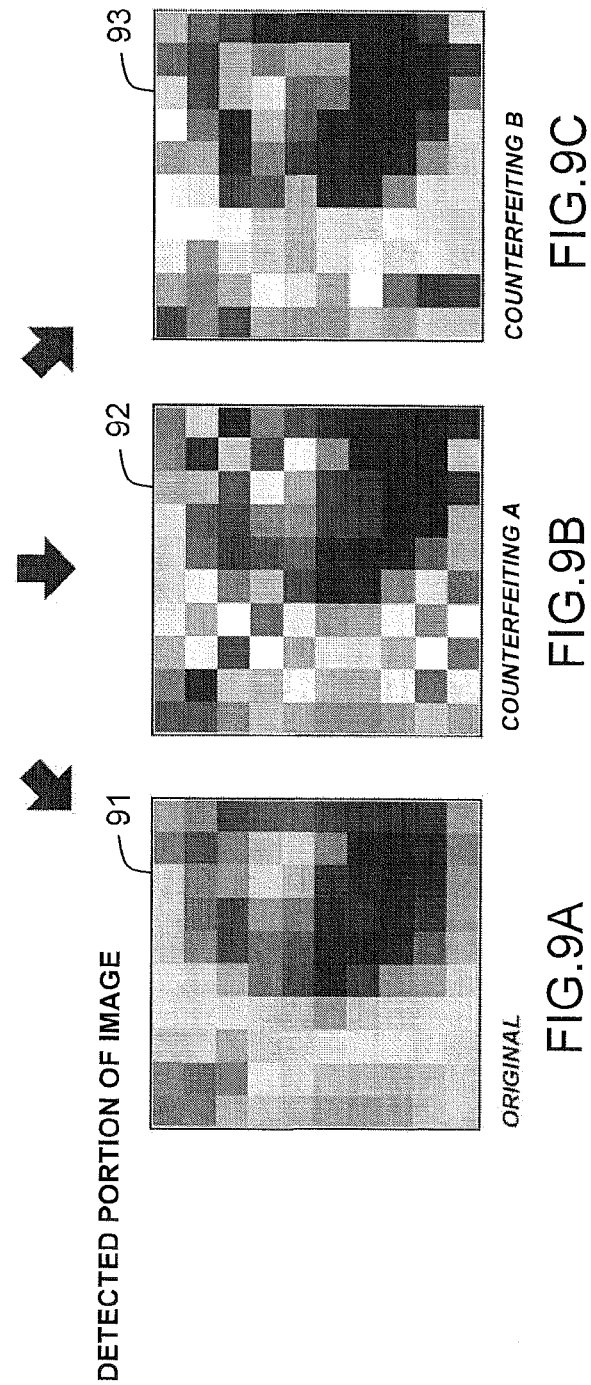
FIG.9A ORIGINAL — DETECTED PORTION OF IMAGE
FIG.9B COUNTERFEITING A
FIG.9C COUNTERFEITING B

OPTICAL SECURITY COMPONENT, FABRICATION OF SUCH A COMPONENT AND SECURE PRODUCT EQUIPPED WITH SUCH A COMPONENT

CROSS-REFERENCE TO RELATED APPLICATIONS

This application is a National Stage Application of International Patent Application No. PCT/EP2013/057632, filed on Apr. 11, 2013, which claims priority pursuant to Article 8 of the Patent Cooperation Treaty and 35 U.S.C. §119(a) to French Patent Application No. 1253444, filed on Apr. 13, 2012. Each of the above-cited priority applications are hereby incorporated by reference in their entireties.

FIELD OF THE INVENTION

The present invention relates to the field of security marking. More particularly, it pertains to an optical security component with reflective effect for verifying the authenticity of a product, to a method for fabricating such a component and to a secure product equipped with such a component.

PRIOR ART

Numerous technologies for authenticating documents or products are known, and in particular for securing documents such as documents of value like banknotes, passports or other identification documents. In particular among these technologies, some are aimed at the production of optical security components whose optical effects as a function of the naked eye observation parameters (orientation with respect to the observation axis, position and dimensions of the light source, etc.) take very characteristic and verifiable configurations. The general aim of these optical components is to provide new and differentiated effects, on the basis of physical configurations that are difficult to reproduce.

Among these components are optical components called DOVID for "Diffractive Optical Variable Image Device" which produce diffractive and variable images that are commonly called holograms. These components are generally observed in reflection, with the naked eye.

French patent applications FR 2959830 and FR 2852267 describe such examples of optical security components. All are compatible with fabrication in large volumes, comprising for example a step of photolithography of an optical structure on a photosensitive support, a galvanoplasty step which makes it possible to transfer these optical structures to a strong material for example based on Nickel so as to produce a matrix and a stamping step carried out on the basis of the matrix so as to transfer the microstructure onto a film and to structure a dielectric material layer, typically a stamping varnish.

Published patent application WO 98/26373 also describes a diffractive structured surface adapted to optical security elements. A modulation of the height of the microstructures supported by the surface enables to generate variable optical effects that can be checked necked-eye. Published patent application US 2010/0071237 also describes optical security elements with variable optical effects, based on diffractive surfaces in which the form and the arrangement of the microstructures are adapted to modify the diffraction efficiency, thus leading to complex visual effects.

Though these components allow excellent authentication with the naked eye by an observer, it is however difficult to undertake reliable automatic authentication of these optical security components. Indeed, the use of ordinary image acquisition apparatuses (of digital photographic apparatus or smart phone type) does not allow the detection of details such as the microstructures of a hologram. When a very high-resolution image acquisition apparatus is used, it nonetheless remains difficult to obtain from a non-expert operator a utilizable snapshot, in particular on account of the angular selectivity of the diffracting optical effects.

Patent application EP 0721849 discloses documents protected against copying by virtue of a particular printing technique. However, the printing methods described are not compatible with fabrication in large volumes according to methods used for the fabrication of components of holographic type.

The present invention presents an optical security component that can be authenticated easily by an image acquisition device and is compatible with fabrication in large volumes according to methods used for the fabrication of components of holographic type. In particular, the optical security component described in the present patent application can be fabricated by processes similar to those of components of holographic type, making it possible to combine during a single fabrication method, various types of optical security components.

SUMMARY OF THE INVENTION

According to a first aspect, the invention relates to an optical security component intended to be checked in reflection in a checking spectral band. The optical security component comprises a layer which is reflective in the said checking spectral band, the said reflective layer exhibiting a zone structured with microstructures distributed spatially in a uniform manner over the whole of the zone so as to form an optical structure which is at least partially scattering in the said checking spectral band. According to the invention, the heights of the microstructures are distributed according to a random function modulated over the said zone by a modulation function so as to form, after illumination of the component at a given angle, an image identifiable by observation in reflection.

The checking spectral band is advantageously in the visible, for example included in a band lying between 380 nm and 780 nm. The microstructures show a modulated mean height, entailing an efficiency of the scattering varying as a function of the regions of the structured zone, making it possible during observation in reflection of the component in direct or indirect reflection, to reproduce an image corresponding to the modulation function, advantageously a high-resolution image. Observation of the image thus formed can be made according to a wide angular expanse, making it easy to authenticate a product furnished with such an optical security component by identifying the image or elements of this image by means of an image acquisition device. The image formed is advantageously an image with a resolution of greater than 2000 dpi (or "dots per inch"), advantageously greater than 3000 dpi or more, allowing the formation of an image of "photographic" quality.

According to a variant, the spatial distribution of the microstructures over the said zone is random, the resulting optical structure being at least partially scattering according to a substantially identical scattering lobe whatever the azimuth. In this case, observation of the component is hardly sensitive to azimuth or indeed insensitive to azimuth.

According to a variant, the spatial distribution of the microstructures over the said zone is ordered along a direction, resulting in observation of an angular scattering lobe varying with azimuth.

According to a variant, the said modulation function is determined on the basis of a high-resolution image digitized into grey levels, for example an image with more than 4000 dpi.

According to a variant, the said modulation function is determined on the basis of repetitive patterns forming a "texture".

According to a variant, the said modulation function is determined on the basis of a high-resolution image digitized into grey levels combined with an additional modulating function.

According to a variant, the said reflective layer is made of metal. The optical security component can furthermore comprise a material layer which is transparent in the said checking spectral band, exhibiting a face in contact with the said structured metallic layer.

According to a variant, the said reflective layer is a high-index dielectric layer encapsulated between two layers of lower index.

According to a second aspect, the invention relates to an optical security element intended for the securing of a product and comprising at least one optical security component according to the first aspect.

According to a third aspect, the invention relates to a secure product comprising a substrate and an optical security element according to the second aspect, fixed on the said substrate.

According to a fourth aspect, the invention relates to a process for fabricating an optical security component intended to be checked in reflection in a checking spectral band comprising:
- the deposition of a layer which is reflective in the said checking spectral band on a structured face of a first material layer which is transparent in the said checking spectral band, the said structured face comprising a zone structured with microstructures distributed spatially in a uniform manner over the whole of the zone so as to form an optical structure which is at least partially scattering in the said checking spectral band, the heights of the microstructures being distributed according to a random function, modulated over the said zone by a modulation function so as to form, after illumination of the component at a given angle, a high-resolution image identifiable by observation in reflection.

According to a variant, the process according to the fourth aspect furthermore comprises the encapsulation of the said reflective layer by a second layer.

According to a variant, the process comprises a prior step of digitizing a high-definition image into grey levels so as to form the said modulation function.

According to a variant, the modulation function obtained by digitizing the said high-definition image is modulated by a so-called texture function, making it possible to reveal repetitive patterns on the image formed after illumination of the component.

BRIEF DESCRIPTION OF THE FIGURES

Other characteristics and advantages of the invention will become apparent on reading the description which follows, illustrated by the figures in which:

FIGS. 1A to 1C, diagrams showing according to one-dimensional sections, examples of profiles respectively of the distribution function for the heights h(x) of the microstructures before modulation, of the modulating function F(x) and of the distribution function for the heights h'(x) of the microstructures after modulation;

FIGS. 4A to 4D, images showing a modulating function according to a two-dimensional plan view and according to a three-dimensional view and images showing the optical structure produced after modulation by the said modulating function of a scattering optical structure of the type of FIGS. 2A and 2B;

FIGS. 7A to 7F examples showing original images (7A, 7B) and images resulting from counterfeiting (7C to 7F);

FIG. 8, an exemplary detector for authenticating an optical security component;

FIGS. 9A to 9C images obtained with the detector of FIG. 8 on each of the images shown in FIGS. 7B, 7D, 7F.

DETAILED DESCRIPTION

The optical security component according to the invention generally comprises a reflective layer with a structured zone. On the structured zone are situated microstructures distributed spatially in a uniform manner over the whole of the zone so as to form an at least partially scattering optical structure. Uniform spatial distribution is understood to mean a spatial distribution of the microstructures which is able to generate by illumination at any point of the zone a similar optical effect. The mean height of the microstructures is modulated over the structured zone by a modulation function so as to form, after illumination of the component at a given angle, a high-resolution image identifiable by observation in reflection.

FIGS. 1A to 1C represent diagrams showing according to one-dimensional sections, examples of profiles respectively of the distribution function for the heights h(x) of microstructures 101 before modulation, of a modulating function F(x) and of the distribution function for the heights h'(x) of the microstructures after modulation. In these figures, the microstructures are not to real scale.

Figure 2A:
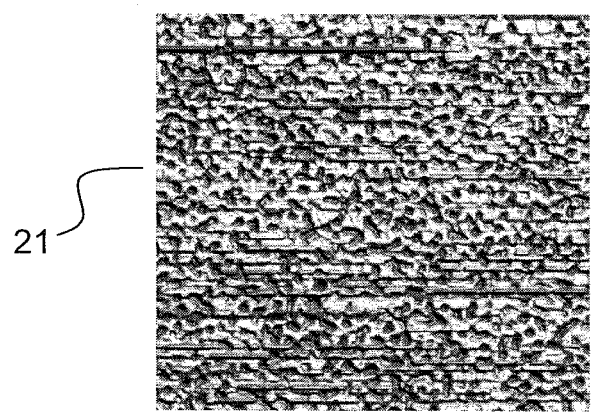
FIGS. 2A and 2B, images of an exemplary scattering optical structure respectively according to a two-dimensional plan view and a three-dimensional view.
Figure 2B:
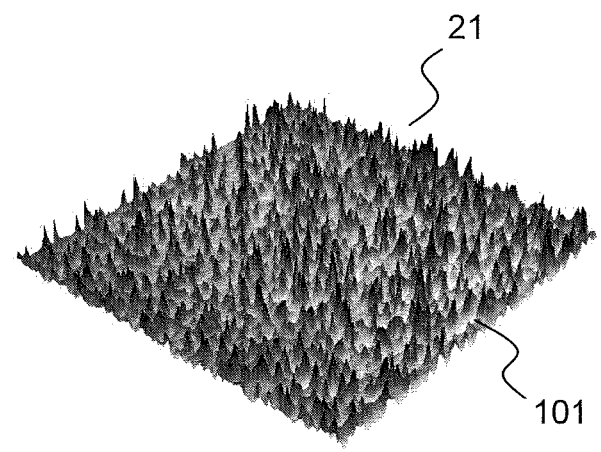

In the example of FIG. 1A, the microstructures 101 are distributed according to a random distribution, at one and the same time spatially and height-wise. An example of such a structure is represented in FIGS. 2A and 2B, showing respectively a two-dimensional plan view of a structured zone 21 and a three-dimensional view of the same zone. These images are obtained using an atomic force microscope (AFM) in which a tip scans the surface to carry out a topography scan by measuring the electric potential difference between the tip and the surface. The structured zone 21 exhibits in this example a square shape 80 microns by 80 microns. The microstructures in FIG. 2B typically exhibit a maximum height of a few hundred nanometers, for example between 400 and 600 nanometers, for example around 500 nanometers, and up to a few microns. The lateral dimensions of the microstructures are for example comparable to the dimensions of the crystal grains of silver bromide that are found on so-called "silvered" photographs, i.e. typically lying between 50 and 1000 nm, making it possible to obtain images of "photographic" quality. The observed lines in FIGS. 2A and 2B come from measurement artefacts due to the scanning of the surface by the tip.

The modulating function F(x) (FIG. 1B) is for example a normalized, continuously varying function. In the example of FIG. 1B, it is for example a continuous function corresponding to a gradient of grey levels. This gradient can go for example from 0 to 1 over a real linear distance on the component of between 100 µm and 10 cm.

In practice the modulating function will be able to be obtained as will be illustrated in other examples, by digitization into grey levels and photo reduction of a high-definition image, typically an image whose resolution after photo reduction is greater than 2500 DPI ("Dots Per Inch") corresponding to an image whose dot fineness is less than about 10 µm.

FIG. 1C illustrates the distribution function h'(x) for the microstructures after modulation by the modulating function F(x). The spatial distribution is unchanged but the mean height of the microstructures is modulated as a function of F(x).

Figure 3A:
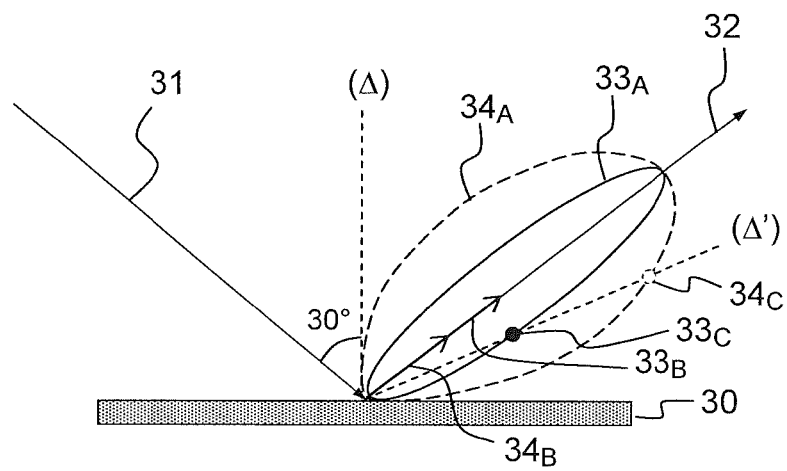
FIG. 3A, an illustrative example of the luminous intensity backscattered by the component in a region of the structured zone where the mean height of the microstructures is zero, and in a region where the mean height is nonzero.

FIG. 3A represents by virtue of an illustrative diagram the structure effect thus obtained after illumination at a given angle. The component 30 carrying the modulated scattering structure (not represented in FIG. 3A) is illuminated by an incident beam exhibiting a given angle with respect to the normal Δ to the surface of the component, for example 30°, an angle of lighting generally used for checking components of holographic type. The lighting is effected for example by means of an arbitrary white source. In the zones of the component where the modulating function is zero or close to zero (for example dark zone of a digitized image), the microstructures exhibit a zero or quasi-zero height (for example less than 10 nm) and hardly scatter at all. The light is therefore completely reflected by the reflective layer in contact with the structured layer and forms the beam 32 visible only in direct reflection. In indirect reflection, that is to say with an angle of greater or less than 30°, the zone will therefore be seen black. In the zones where the modulating function is nonzero, the microstructures locally exhibit heights whose mean varies with the modulating function. The larger the mean height of the microstructures, the more significant the scattering. Thus in the example of FIG. 3A, a scattering lobe $34_A$ is observed that is broader than a scattering lobe $33_A$, the scattering lobe $34_A$ corresponding to a region of the structured zone of the component in which the value of the modulating function is larger (this is for example a bright dot of the digitized image forming the modulating function) and the scattering lobe $33_A$ corresponding to a region of the structured zone of the component in which the value of the modulating function is lower (dark dot of the digitized image forming the modulating function). To the scattering lobe $34_A$ there corresponds a residual direct reflection symbolized by the arrow $34_B$ of lower luminous intensity than the direct reflection symbolized by the arrow $33_B$ corresponding to the scattering lobe $33_A$. The image in direct reflection is therefore seen "in negative" with respect to the digitized image forming the modulating function. On the other hand, the checking of the component along a given axis Δ' different from the direct reflection will make it possible to reveal luminous intensities corresponding to the grey levels of the digitized image from which the modulating function originates. In FIG. 3A, the intensities seen along the axis Δ' are thus indicated by the dot $33_C$ for the region of the structured zone corresponding to a darker dot and $34_C$ for the region of the structured zone corresponding to a brighter dot. A reversal of the contrast in luminous intensity with respect to observation in direct reflection is thus observed on the observation axis Δ'.

In a first level of authentication of an optical security component according to the present invention, it will thus be possible to observe a reversal of contrast between an observation at the specular angle (angle of direct reflection) and an observation along an axis different from the direct reflection axis. In a silvered photo or a printed document conversely, the luminous intensity is either absorbed by the pigment (the bigger the pigment density the stronger the absorption), or reflected. The information is therefore visible with an identical contrast whatever the angle of observation. In an amplitude-modulation optical security component such as that described in the present patent application, the absorption is zero and the light can be scattered with a maximum intensity at the specular order for a region of low modulation amplitude (intensity #100% of the incident light for a mirror) or can be scattered with a maximum intensity at an angle different from the specular angle for a region of high modulation amplitude. This shift of the maximum intensities is manifested by a reversal of contrast between vision at the specular angle and vision shifted by this reference angle, allowing a first degree of authentication with respect to images obtained by silvering-based photography or by printing for example.

Figure 3B:
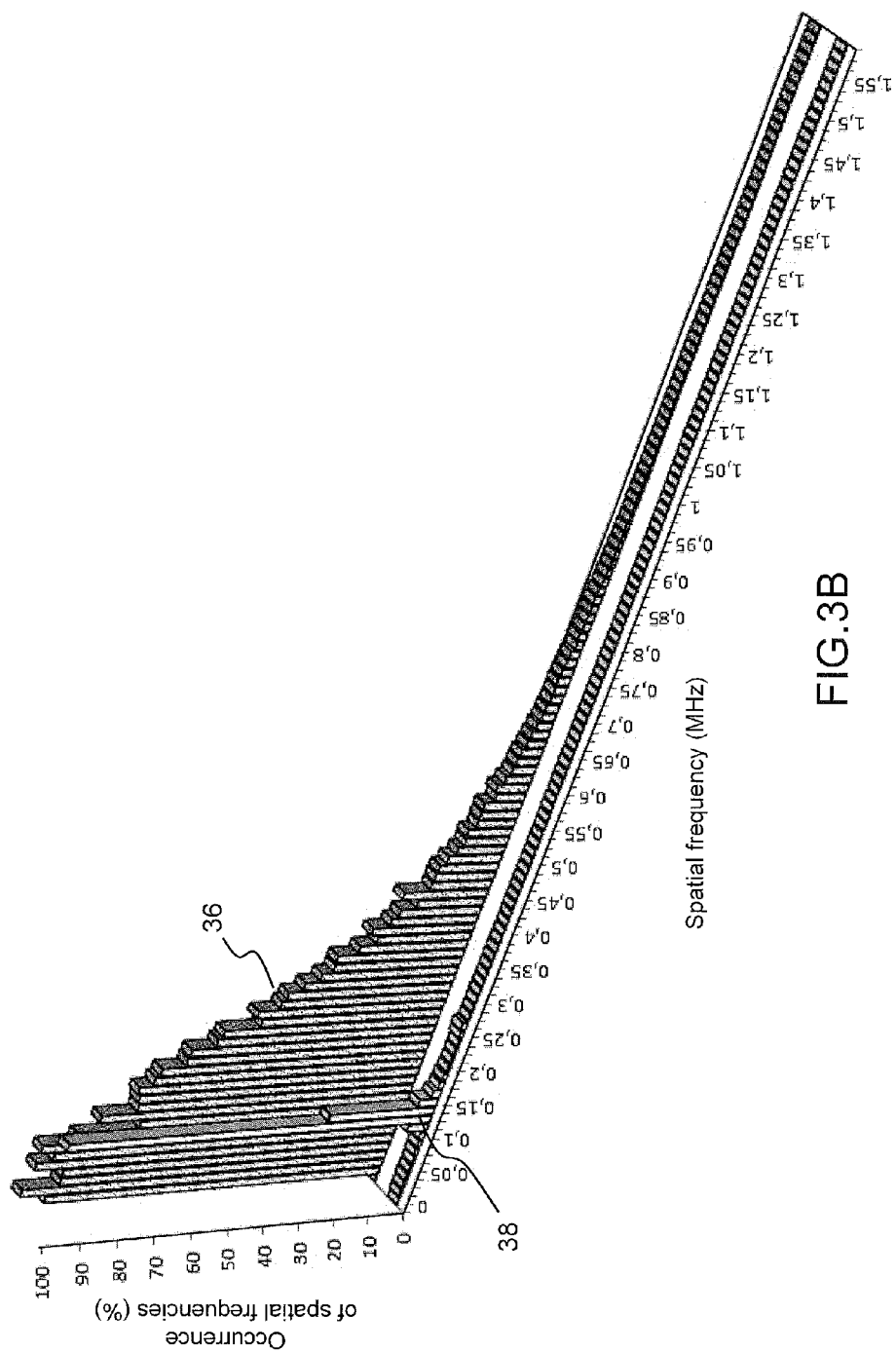
FIGS. 3B and 3C, curves illustrating the occurrence of the spatial frequencies of the microstructures (per scanned line in the image) in case respectively of a random spatial arrangement of the microstructures and of an ordered arrangement along one direction.

In the example shown in FIGS. 2A and 2B, the spatial repartition of the microstructures is random in all directions, thus forming an isotropic diffusing white effect. FIG. 3B shows (curve 36) the distribution of the spatial frequencies in the example of a structure forming an isotropic diffusing white as illustrated in FIGS. 2A, 2B. The distribution is given here by calculating for a given spatial frequency, the number of occurrences of said frequency in the image scanned using an atomic force microscope along a given direction of analysis. More precisely, FIG. 3B shows the ratio of the number of scanned lines in which the frequency appears to the total number of scanned lines. The curve 36 in FIG. 3B is compared to a curve 38 that represents the spatial frequency distribution in case of a diffractive structure, formed of a grating of a given period in the direction of analysis. In the case of a structure forming an isotropic diffusing white (curve 36), an homogeneous distribution of the spatial frequencies of the microstructures is observed, with a lorentzian like distribution, while in the case of the diffractive structure (curve 38), the frequency distribution shows a peak centered on a frequency corresponding to the grating period. In case of a structure forming an isotropic diffusing white, the distribution curve is the same in all analysis directions.

According to a variant, the microstructures can be arranged spatially in an ordered manner along at least one direction, thus forming a spatially oriented scattering effect. This is manifested by a variation of the luminous intensity observed as a function of azimuth and adds an additional degree of checking. However, when the microstructures are arranged in an ordered manner along one direction, thus forming lines, it is important to avoid introducing a periodic arrangement of the lines to keep a "white" aspect.

Figure 3C:
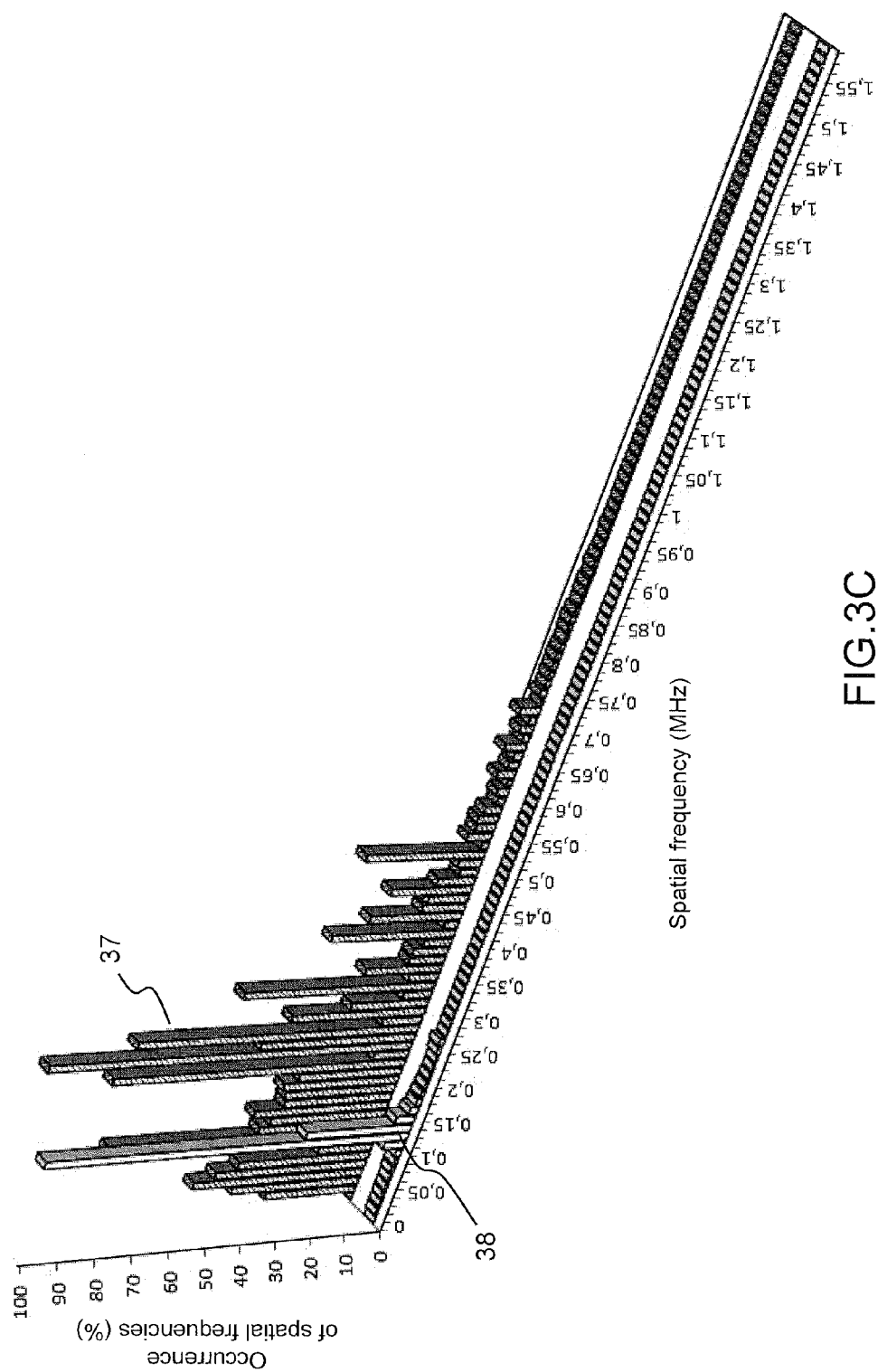

FIG. 3C illustrates the spatial frequency distribution of the microstructures when the microstructures are arranged spatially in an ordered manner in a given direction (curve 37), compared with the curve 38 showing the distribution of the spatial frequencies for a diffractive structure. A spatial frequency distribution over the same frequency band is observed as for a structure forming an isotropic diffusing white. However, multiple local distribution peaks are observed at non-zero frequencies.

FIGS. 4A to 4D show images of a modulating function according to a two-dimensional plan view (FIG. 4A) and according to a three-dimensional view (FIG. 4B) and images showing the optical structure produced after modulation by the said modulating function of a scattering optical structure of the type of FIGS. 2A and 2B, respectively according to a two-dimensional plan view (FIG. 4C) and according to a three-dimensional view (FIG. 4D).

FIG. 4A shows the image 41 obtained after digitization and photo reduction of a high-definition digital image. The size of the image is substantially identical to that of a structured zone of the type of that represented in FIG. 2A, i.e. about 80×80 microns. In this example, the image represents an identifiable "R". It comprises a part 410 in which the intensity is a maximum, equal for example to 1, a part 411 in which the intensity is zero and a transition part 412 between the part 410 and the part 411. In the part 412, a progressive decrease in the intensity of the dots of the image is observed. These zones are found in the three-dimensional view of FIG. 4B. To obtain the optical security component, a structured zone of the type of that represented in FIGS. 2A and 2B is modulated by the modulation function of FIG. 4A. A structured zone 42 such as represented in FIGS. 4C and 4D is thus obtained. The microstructures exhibit a maximum mean height in the zone 410, a zero height in the zone 411 and a decreasing mean height in the zone 412. After illumination of the optical security component at a given angle of incidence, for example 30°, an image will be able to be observed, either in direct reflection, or in indirect reflection. The structure being formed on a reflective layer, the plane part (411) will exhibit a maximum coefficient of reflection in direct reflection, while the part 411 will exhibit a maximum scattering and therefore a minimum direct reflection. The image will therefore be observed in "negative", the white zones of the image being seen black and vice versa. Conversely, if the image is observed in indirect reflection, that is to say with a different angle from the angle of incidence, the scattering effect will be a maximum for the parts in which the microstructures are of larger mean height and a minimum for the parts in which the microstructures are of lower heights. The image will then be seen in "positive". The complementarity of the two images makes it possible during automatic checking to circumvent the angle-related problems that may be encountered with diffractive images. For this purpose, the image processing associated with the element will be able to consider the absolute values of the variations.

Figure 5A:
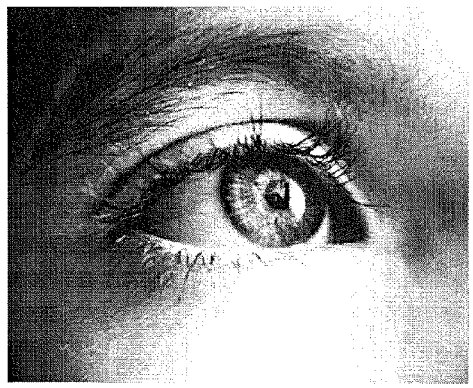
FIGS. 5A to 5D, images according to a two-dimensional plan view respectively of a modulating function obtained by digitizing a high-resolution image into grey levels, of a scattering optical structure, of the structure resulting from the modulation of the scattering structure by the said modulating function, of the structure resulting from the modulation of the scattering structure by the said modulating function when the latter is moreover modulated by a so-called texture function.
Figure 5B:
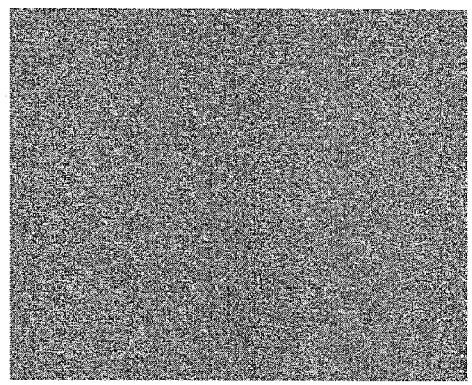
Figure 5C:
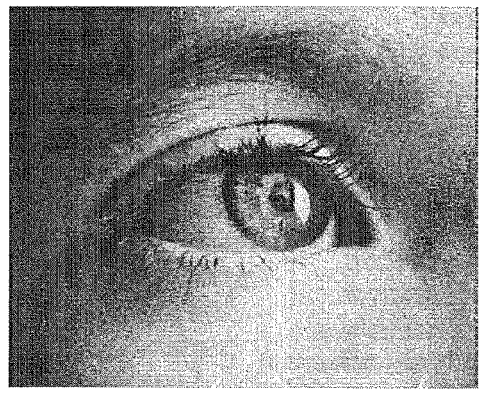
Figure 5D:
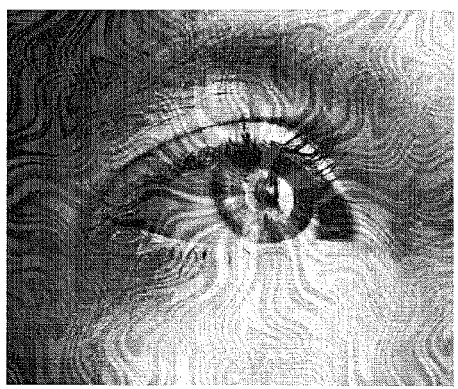

FIGS. 5A to 5D show images according to a two-dimensional plan view respectively of a modulating function obtained by digitization into grey levels and photo reduction of a high-resolution image (FIG. 5A), of a scattering optical structure (FIG. 5B), of the structure resulting from the modulation of the scattering structure by the said modulating function (FIG. 5C), of the structure resulting from the modulation of the scattering structure by the said modulating function when the latter is moreover modulated by a texture function (FIG. 5D).

In this example, the initial image 51 is complex, exhibiting variations in grey levels with a very large resolution to obtain an identifiable image (here, an eye). FIG. 5B illustrates a plan view of a random structure which is modulated by the modulation function formed on the basis of the image of FIG. 5A so as to form the structure 5C. The image obtained in reflection by a structure of this type, exhibiting microstructures whose mean height is modulated as a function of the modulation function defined by the image 51, will make it possible to form in indirect reflection, a high-resolution image whose contours, "colour" (grey levels), and texture will be able to be identified by a digital acquisition device in order to authenticate a product on which the optical security component is arranged. To further facilitate authentication, the modulation function can be defined on the basis of the image 51 to which is added a "texture", formed of periodic patterns, in one or two dimensions, whose characteristic dimensions are typically at least 20 times greater than the dimensions of the microstructures. Such a modulation function is illustrated in FIG. 5D. This makes it possible to create additional identification elements in the observed image and therefore to make it more complex.

Figure 6A:
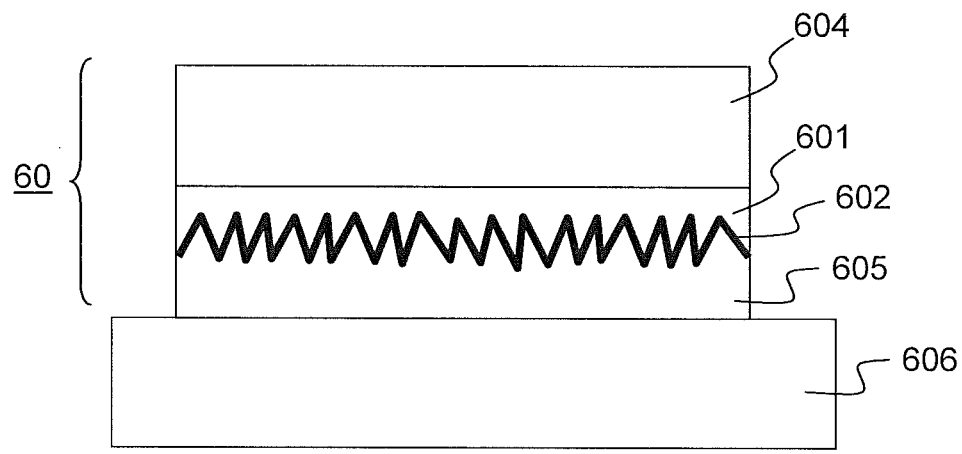
FIGS. 6A and 6B examples of secure products comprising optical security components, according to two exemplary embodiments.
Figure 6B:
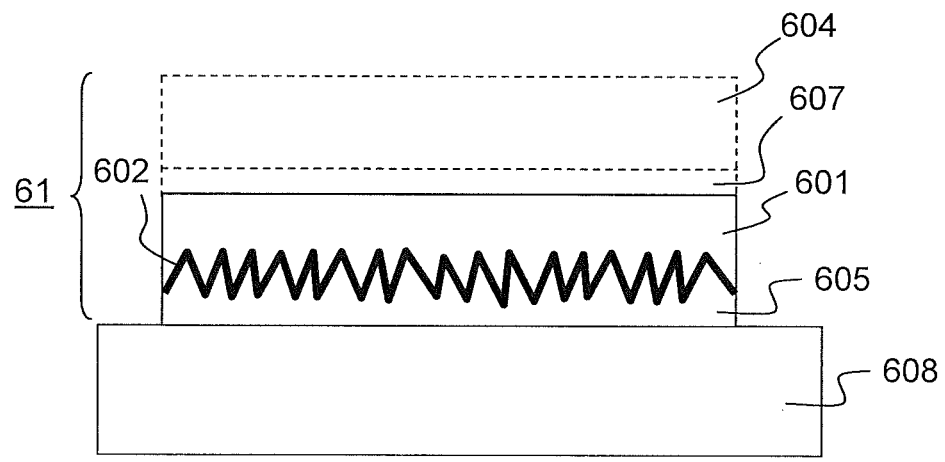

FIGS. 6A and 6B represent in a schematic manner a sectional view of a secure product on which is arranged an optical security component according to two variants. In the example of FIG. 6A, this entails a component 60 of label type, intended to be glued onto a product 606 to be made secure. In the example of FIG. 6B, this entails a component 61 intended to be hot-transferred to a substrate 608, for example a sheet of paper or of plastic of a security document.

The security components 60, 61 can be produced in the following manner. The optical structures are recorded by electron beam photolithography or lithography on a photosensitive support or "photoresist" as it is known. This step makes it possible to produce the structured zone or zones by using for example digital masks combining the random function and the modulation function. A galvanoplasty step makes it possible to transfer these optical structures to a strong material for example based on Nickel so as to produce the matrix or "master". A stamping is carried out on the basis of the matrix to transfer the microstructure onto a film and to structure a transparent material layer 601 (FIG. 6A, 6B), typically a stamping varnish a few microns thick carried by a film 604 of 12 µm to 50 µm made of polymer material, for example PET (polyethylene terephthalate). The stamping can be done by hot pressing the transparent material ("hot embossing") or by moulding ("UV casting" or "UV curing"). The refractive index of the layer formed of the stamping varnish is typically 1.5. Next comes the deposition on the layer thus embossed of a reflective layer (602, FIGS. 6A, 6B). The reflective layer can be either a metallic layer, for example a layer of aluminium, typically between 20 and 100 nm thick, or a high-index layer, whose optical index is advantageously greater than 1.7, for example zinc sulphide (ZnS). The thickness of such a layer is for example between 40 and 150 nm for ZnS. A sealing layer 605 can then be applied, for example by a coating method. For certain applications, such as hot-marking or rolling products, this layer can be the adhesive layer (FIG. 6B). The sealing layer typically exhibits a thickness of greater than several microns. Depending on the final destination of the product, an adhesive can be applied to the sealing layer or directly to the reflective layer. According to a variant, a detachment layer 607 (for example a wax) can be applied between the stamping varnish 601 and the support film 604 made of PET. The security element is transferred onto the document by hot pressing the security element onto the document, the security component 61 being situated facing the document. During transfer, the adhesive film sticks to the support of the document and the detachment layer as well as the support film are removed.

As is apparent in view of the exemplary fabrication process described hereinabove, the inclusion of an optical security component according to the invention in a secure document is compatible with the presence in the same document of grating-based structures customarily used for the production of holographic components.

In particular, it will be possible to produce an optical security element comprising one or more components such as described previously and one or more other types of optical security components, for example of holographic type and for example of DOVID type.

Accordingly a matrix will be able to be produced by recording the various patterns corresponding to the various optical security components on the photoresist support which will subsequently be transferred onto a nickel support by galvanoplasty. The stamping can be carried out thereafter on the basis of the matrix so as to transfer the various microstructures to the polymer material film, intended for embossing. The deposition of the reflective layer for the components according to the invention will be able to be done over the whole of the film, since it will not impede the other components of DOVID type also operating in reflection.

As was described previously through a series of illustrative examples, the optical security component comprises a modulated optical structure, which under illumination at a given angle, will make it possible to form in direct and indirect reflection, a recognizable image of photographic quality, in grey levels, optionally with texture effects in the form of repetitive patterns, which may according to a variant be periodic and/or directional.

Counterfeiting of such a component can be carried out either by attempted reproduction of the same method but with a less efficacious technology, or by attempted reproduction by means of a digital reproduction device (scanner) or of a photocopier. FIGS. 7A, 7C and 7E thus represent respectively an original image 71 obtained by the process described in the present patent application, an image 73 resulting from the attempted counterfeiting of the component by a method of the screen printing type (counterfeiting A), an image 75 resulting from attempted counterfeiting by a method of holographic type (counterfeiting B). The images 72, 74, 76 represented in FIGS. 7B, 7D, 7F respectively are magnifications produced on the basis of a zone of the images 71, 73, 75. As is apparent in FIG. 7D, the counterfeiting of type A entails the obtaining of an image consisting of black dots oriented according to a screen (binary image). As is apparent in FIG. 7F, a counterfeiting of type F results in the obtaining of an image consisting of substantially finer dots than in the image obtained by the counterfeiting of type A, but here again, the resulting image is binary.

During authentication by means of a detector of which a matrix 80 of pixels 81 is illustrated in FIG. 8, an image is observed which appears deformed on account of the lower resolution of the detector. Thus, the image 91 formed by the detector 80 on the basis of the original image 72 is represented in FIG. 9A and the images 92 and 93 formed by the detector 80 on the basis of the images resulting from the counterfeiting of type A or B are represented in FIGS. 9B and 9C respectively. Though the low resolution of the authentication detector entails a "pixellation" of the original image, it is observed, however, that the structures of the images formed by the authentication detector on the basis of the forgeries differ from the image formed on the basis of the original. In particular, the appearance of white and black pixels, which were not in the image 91 formed on the basis of the original image, is observed on the images 92, 93 obtained by formation of the image of the images 74, 76, arising from the counterfeiting. It is the analysis of the structural elements of the image which will make it possible to detect the counterfeiting for example by virtue of algorithms for processing images based on the detection of the shape and/or of the grey levels and/or of the texture.

Although described through a certain number of exemplary embodiments, the optical security component according to the invention and the method for fabricating the said component comprise alternative variants, modifications and refinements which will be obviously apparent to the person skilled in the art, it being understood that these alternative variants, modifications and refinements form part of the scope of the invention as defined by the claims which follow.

The invention claimed is:

1. An optical security component intended to be checked in reflection by an acquisition device in a checking spectral band, comprising:
    a layer which is reflective in the checking spectral band, wherein the layer is deposited on a structured face of a material layer transparent in the checking spectral band and wherein the structured face exhibits a structured zone comprising:
    microstructures distributed spatially in a random manner over the whole of the structured zone with a spatial frequency distribution following a lorentzian curve so as to form an optical structure which under illumination in the checking spectral band forms an isotropic diffusing white, wherein the heights of the microstructures are distributed according to a random function, modulated over the zone by a modulation function so as to form, after illumination of the component at a given angle, a first image in grey levels identifiable by observation in direct reflection and a second image in grey levels identifiable by observation in indirect reflection, identical to the first image with the exception of a reversed contrast.

2. The optical security component according to claim 1, in which the modulation function is determined on the basis of a high-resolution image digitized into grey levels.

3. The optical security component according to claim 1, in which the modulation function is determined on the basis of a set of repetitive patterns so as to form a texture.

4. The optical security element intended for the securing of a product and comprising at least one optical security component according to claim 1.

5. A secure product comprising a substrate and an optical security element according to claim 4, fixed on the said substrate.

6. A method for fabricating an optical security component intended to be checked in reflection in a checking spectral band comprising:

the deposition of a layer which is reflective in the checking spectral band on a structured face of a first material layer which is transparent in the checking spectral band, wherein the structured face comprises at least one zone structured with microstructures distributed spatially in a random manner over the whole of the zone with a spatial frequency distribution following a lorentzian curve so as to form an optical structure which under illumination in the checking spectral band forms an isotropic diffusing white, wherein the heights of the microstructures are distributed according to a random function, modulated over the zone by a modulation function so as to form, after illumination of the component at a given angle, a first image in grey levels identifiable by observation in direct reflection and a second image in grey levels identifiable by observation in indirect reflection, identical to the first image with the exception of a reversed contrast.

7. The method for fabricating an optical security component according to claim 6, furthermore comprising the encapsulation of the reflective layer by a second layer.

8. The method for fabricating an optical security component according to claim 6, comprising a prior step of digitizing a high-definition image into grey levels so as to form the said modulation function.

9. The method for fabricating an optical security component according to claim 8, in which the modulation function obtained by digitizing the said high-definition image is modulated by a texture function, making it possible to reveal repetitive patterns on the image formed after illumination of the component.

* * * * *